United States Patent [19]

Miyazaki et al.

[11] 4,403,174
[45] Sep. 6, 1983

[54] COMMUTATORLESS DC MOTOR DRIVE DEVICE

[75] Inventors: Kiyoshi Miyazaki, Komagane; Jinichi Ito, Ina, both of Japan

[73] Assignee: Kabushiki Kaisha Sankyo Seiki Seiksakusho, Nagano, Japan

[21] Appl. No.: 293,060

[22] Filed: Aug. 17, 1981

[30] Foreign Application Priority Data

Aug. 20, 1980 [JP] Japan .................................. 55-113390

[51] Int. Cl.$^3$ ............................................. H02K 29/00
[52] U.S. Cl. ..................................... 318/254; 318/138
[58] Field of Search ............ 307/355; 318/254, 254 A, 318/138; 330/261, 271, 254

[56] References Cited

U.S. PATENT DOCUMENTS 3,684,974  8/1972  Solomon et al. .................. 330/30 D
4,135,120  1/1979  Hoshimi et al. ...................... 318/138

Primary Examiner—J. V. Truhe
Assistant Examiner—Saul M. Bergmann
Attorney, Agent, or Firm—Sughrue, Mion, Zinn, Macpeak & Seas

[57] ABSTRACT

A commutatorless DC motor drive device in which errors due to offset voltages of differential amplifiers used therein are eliminated to thereby cause the rotor to rotate at a stable speed. Double-balance differential amplifier circuits are arranged to receive outputs of corresponding magnetic sensitive elements, such as HALL elements, upon differential input terminals thereof and external control signals upon differential control voltage terminals thereof. The outputs from the magnetic sensitive elements are amplified with an amplification factor determined by the control signals. The control signals have an amplitude determined in accordance with the rotational speed of the rotor. Output circuits control the amount of current fed to the stator coils in accordance with differential outputs of the double-balance differential amplifier circuits.

10 Claims, 14 Drawing Figures

COMMUTATORLESS DC MOTOR DRIVE DEVICE

BACKGROUND OF THE INVENTION

The present invention relates to a commutatorless DC motor drive device.

A conventional commutatorless DC motor drive device will be described with reference to FIGS. 1 and 2. Coils 2 and 3 and coils 4 and 5 are arranged coaxially on the surface of a stator yoke 1. The coils 2 and 3 are series-connected to form a stator coil $L_A$ for one phase A, while the coils 4 and 5 are also series-connected to form a stator coil $L_B$ for the other phase B. In correspondence to the stator coils $L_A$ and $L_B$ on the surface of the stator yoke 1, a rotator magnet 6 is magnetized to have ten poles in such a manner that the magnetic flux distribution is sinusoidal, as indicated by a two-dot chain line in the figure. The rotor magnet 6 thus magnetized is rotatably arranged. The stator coils $L_A$ and $L_B$ forming the two phases are so arranged that the phases thereof are different from each other by an odd number times 90° in electrical angle. In correspondence to the stator coils $L_A$ and $L_B$ of the phases A and B, Hall elements 7 and 8 are arranged at positions to detect the poles of the rotor magnet. That is, they are arranged at positions different in phase by an electrical angle of 90°.

The drive circuit for this arrangement is constructed as follows: The output of the Hall element 7 corresponding to the phase A is applied to an amplifier 9, the output of which is applied to an output circuit 10. The output of the output circuit 10 is connected to the stator coil $L_A$. For the other phase B, the Hall element 8, an amplifier 11, an output circuit 12 and the stator coil $L_B$ are connected similarly as in the case of the phase A. The input terminals of the Hall elements 7 and 8 are connected in series and are then connected to a current controller 13. The current controller 13 operates to control the input currents of the Hall elements 7 and 8 according to a signal voltage proportional to the rotational speed of the motor which is obtained through a frequency-to-voltage converter 15 and a low-pass filter 16 from the coil 14 of a sensor adapted to detect the rotational speed of the rotator magnet 6.

Thus, in the conventional drive circuit, the input currents of the Hall elements 7 and 8 are controlled by the output of the frequency generator 14, whereby the output voltages of the Hall elements 7 and 8 are varied to control the amounts of current fed to the stator coils $L_A$ and $L_B$ are thereby to control the rotational speed of the rotor magnet 6.

The operating conditions of the motor will now be considered. In the case where the motor is operated at a low speed or under a light load, the amounts of current fed to the stator coils $L_A$ and $L_B$ may be small. In this case, the output voltages of the Hall elements 7 and 8 are low, and therefore the offset voltages of the amplifiers 9 and 11 cannot be neglected.

In other words, the output voltage $V_H$ of the Hall element as shown in FIG. 3(a) is added to the offset voltage $V_O$ of the amplifier as shown in the FIG. 3(b). The resulting voltage has a waveform in which the peak value on the positive side is different from that on the negative side. Since this voltage is amplified, a current $I_L$ having an amplitude on the positive side different from that on the negative side, as shown in FIG. 3(c), is applied to the stator coil. Thus, it is impossible to rotate the rotor stably.

SUMMARY OF THE INVENTION

To overcome this difficulty, in accordance with the invention, instead of the amplifiers 9 and 11, double-balance differential amplifiers (or so-called "MPX circuits") are employed to eliminate errors due to the offset voltages of the amplifiers to thereby rotate the rotor stably.

More specifically, the invention provides a commutatorless DC motor drive device including a rotor magnet magnetized with a plurality of magnetic poles, a plurality of stator coils arranged in correspondence with the rotor magnet, a plurality of magnetic sensitive elements for detecting positions of the magnetic poles of the rotor magnet, means for amplifying outputs of the magnetic sensitive elements and delivering the amplified outputs into a network containing a resistor, means for producing a signal having a current waveform equivalent to those of the outputs of the magnetic sensitive elements with the signal producing means including amplifying means whose input is connected across said resistor terminals and whose output current signals are fed to the stator coils, said current signals having the same waveform as the current flowing through said resistor.

Further, the invention provides a commutatorless DC motor drive device including a rotor magnet magnetized with a plurality of magnetic poles, a plurality of stator coils arranged in correspondence with the rotor magnet, magnetic sensitive elements for detecting positions of the magnetic poles, double-balance differential amplifier circuit receiving outputs of corresponding ones of the magnetic sensitive elements upon differential input voltage terminals thereof and external control signals upon differential control voltage terminals thereof for amplifying the outputs of the magnetic sensitive element in accordance with the control signals, and output circuits for controlling the amount of currents fed to the stator coils, in accordance with differential outputs of the double-balance differential amplifier circuits.

DESCRIPTION OF THE PREFERRED EMBODIMENTS

Figure 1:
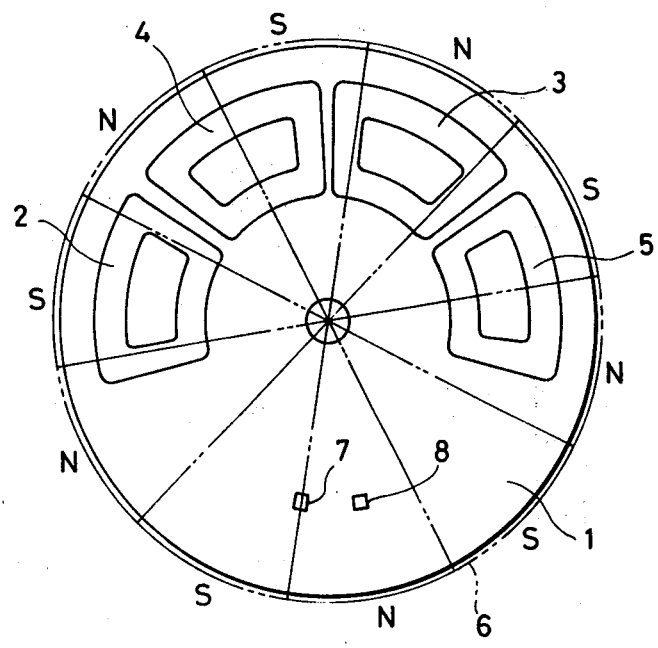
FIG. 1 is an explanatory diagram showing the arrangement of stator coils and Hall elements of a conventional commutatorless motor.
Figure 2:
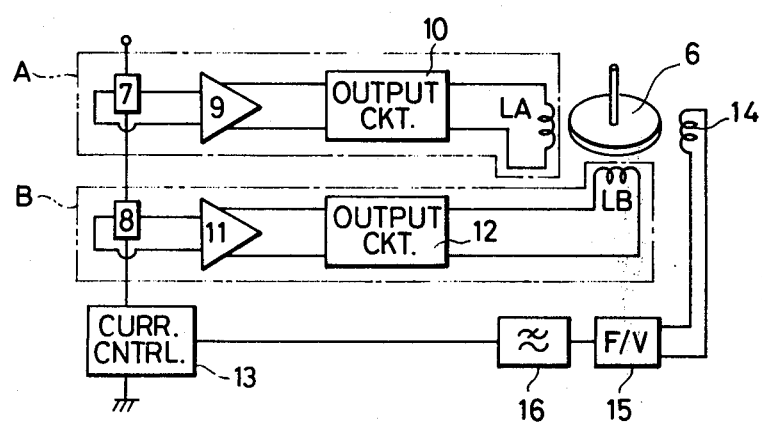
FIG. 2 is a block diagram showing a conventional drive circuit.
Figure 3A:
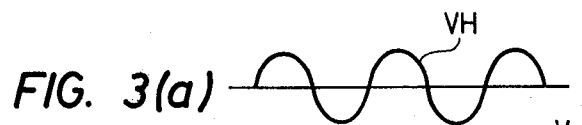
FIG. 3(a) is a diagram showing an output voltage waveform of a Hall element in FIG. 2.
Figure 3B:
FIG. 3(b) is a diagram showing an offset voltage waveform of an amplifier in FIG. 2.
Figure 3C:
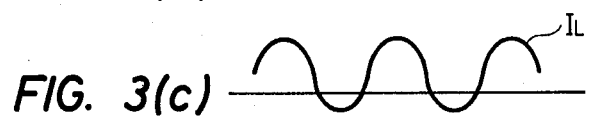
FIG. 3(c) is a diagram showing a stator coil drive current waveform in a conventional drive circuit.

A preferred embodiment of a drive circuit according to the invention will be described with reference to FIG. 4 which shows the drive circuit employed for a two-phase commutatorless DC motor.

A Hall element 7 for one phase A has output terminals 7a and 7b connected to the differential input terminals 17a and 17b of a double-balance differential amplifier 17, the differential output terminals 17c and 17d of which are connected to the input terminals 18a and 18b of an output circuit 18, respectively. The output terminals 18c and 18d of the output circuit 18 are connected to the stator coil $L_A$.

A Hall element 8 for the other phase B has output terminals 8a and 8b connected to the differential input terminals 19a and 19b of a double-balance differential amplifier 19, the differential output terminals 19c and 19d of which are connected to the input terminals 20a and 20b of an output circuit 20, respectively. The output terminals 20c and 20d of the output circuit 20 are connected to the stator coil $L_B$.

The Hall elements 7 and 8 and the stator coils $L_A$ and $L_B$ are arranged in the same manner as in the prior art described with reference to FIG. 1.

The generating coil 14 of a sensor adapted to detect the rotational speed of the rotor magnet 6 is connected to the input terminals 15a and 15b of a frequency-to-voltage converter 15, the output terminals 15c and 15d of which are connected to the input terminals 16a and 16b of a low-pass filter 16, respectively. The output terminals 16c and 16d of the low-pass filter 16 are connected to the input terminals 21a and 21b of an inversion control circuit 21, the output terminals 21c and 21d of which are connected to the differential control terminals 17e and 17f of the double-balance differential amplifier 17 and to the differential control terminals 19e and 19f of the double-balance differential amplifier 19, respectively. When a signal S is applied to the control terminal 21e of the inversion control circuit 21, the circuit 21 inverts the output signal of the low-pass filter 16.

The Hall element 7 has an input terminal 7c connected through a resistor $R_1$ to a power source $+V_{cc}$ and an input terminal 7d connected to an input terminal 8c of the Hall element 8. An input terminal 8d of the Hall element 8 is grounded through a resistor $R_2$.

The drive circuit thus constructed operates as follows: The output voltage of the Hall elements 7 and 8 which detect the rotary poles of the rotor magnet 6 are amplified by the double-balance differential amplifiers 17 and 19. On the other hand, the generating coil 14 of the sensor which detects the rotational speed of the rotor magnet 6 provides an output having a frequency proportional to the rotational speed of the rotor magnet. The output thus provided is converted into an output voltage converter 15. The output voltage is applied to the low-pass filter 16 where harmonic components are removed therefrom. The output of the low-pass filter 16 is applied to the inversion control circuit 21. The output of the inversion control circuit 21 is applied to the differential control terminals 17e, 17f, 19e and 19f of the double-balance differential amplifier 17.

The presence or absence of the control signal S to the inversion control circuit 21 determines whether the difference voltage between the differential control terminals 17e and 17f of the double-balance differential amplifier 17 and the difference voltage between the differential control terminals 19e and 19f of the double-balance differential amplifier 19 are made positive or negative. In other words, the presence or absence of the control signal S determines whether or not the phases of currents flowing in the stator coils $L_A$ and $L_B$ should be shifted by 180° to thereby determine the direction of rotation of the rotor magnet 6.

The amplification factors of the double-balance differential amplifiers are determined by the input voltages applied to the differential terminals 17e and 17f, and 19e and 19f. The output voltages of the Hall elements 7 and 8 are amplified according to the amplification factors thus determined to drive the output circuits 18 and 20 to supply drive currents to the stator coils $L_A$ and $L_B$, respectively.

As is clear from the above description, in accordance with the invention, the speed of the rotor magnet is controlled by varying the amplification factors of the double-balance differential amplifiers instead of the input currents to the Hall elements. Therefore sufficiently large currents can be applied to the Hall elements at all times. Accordingly, even when the motor is operated at a low speed or under a light load, the output voltages of the Hall elements are high so that the differential input voltages to the double-balance differential amplifiers are high and the offset voltages of the double-balance differential amplifiers are insignificant. The ouput voltages of the Hall elements are directly amplified, and drive currents proportional to the output voltage of the Hall elements, which are in proportion to the pole variations of the rotor magnet, are applied to the stator coils so that the rotor magnet is stably rotated.

Figure 5:
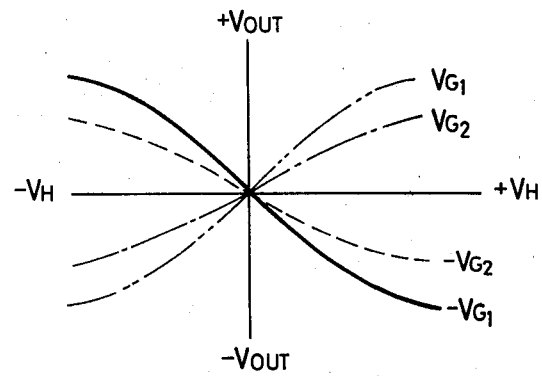
FIG. 5 is a graphical representation indicating input and output characteristic curves of a double-balance differential amplifier in FIG. 4.

Assuming that the double-balance differential amplifier has a differential input voltage $V_H$, a differential control voltage $V_G$ and a differential output voltage $V_{OUT}$, then as shown in FIG. 5, the relationship between the differential input voltage $V_H$ and the differential output voltage $V_{OUT}$ varies as the differential control voltage changes as indicated at $V_{G1}$, $V_{G2}$, $-V_{G2}$ and $-V_{G1}$. As the absolute value of the differential input voltage $V_H$ becomes large, the differential output voltage $V_{OUT}$ approaches a certain value asymptotically. Therefore, in the case where the differential input voltage $V_H$ is high, even if the differential input voltage $V_H$ fluctuates slightly, the differential output voltage $V_{OUT}$ changes very little. That is, it can be regarded as constant.

With the double-balance differential amplifier having the above-described characteristics, even if, in the case where the input currents of the Hall elements are made sufficiently large and the output voltages of the Hall elements are made high as in the case of the invention, the output voltage of the Hall element 7 for one phase is different from that of the Hall element 8 for the other phase, the differential output voltages $V_{OUT}$ are little affected by the difference in output voltage between the Hall elements. Accordingly, currents having the same waveform are applied to the stator coils for the two phases. Thus, the commutatorless DC motor rotates more stably.

A specific example of a circuit for one of the two phases, for instance the phase A, of the commutatorless DC motor drive device will be described with reference to FIG. 6.

In the double-balance differential amplifier 17, transistors $Q_1$ and $Q_2$, $Q_3$ and $Q_4$, and $Q_5$ and $Q_6$ form respective differential amplifiers. The collector of the transistor $Q_5$ is connected to the commonly-connected emitters of the transistors $Q_1$ and $Q_2$. The collector of the transistor $Q_6$ is connected to the commonly-connected emitters of the transistors $Q_3$ and $Q_4$. One output terminal 7a of the Hall element 7 is connected to the common base of the transistors $Q_2$ and $Q_3$, i.e. one differential input terminal 17a. The other output terminal 7b of the Hall element 7 is connected to the common base of the transistors $Q_1$ and $Q_4$, i.e. the other differential input terminal 17b. The collector of the transistor $Q_1$ is connected through a resistor $R_3$ to the power source $+V_{cc}$. The collector of the transistor $Q_4$ is connected through a resistor $R_4$ to the power source $+V_{cc}$. The collectors of the transistors $Q_1$ and $Q_3$ are connected together to one differential output terminal 17c and the collectors of the transistors $Q_2$ and $Q_4$ are connected to the other differential output terminal 17d.

In a constant voltage source 22, the base of a transistor $Q_7$ is connected to the connecting point between a Zener diode $D_z$ and a resistor $R_{16}$, and the emitter thereof is connectto a series circuit of resistors $R_5$ and $R_6$ and a transistor $Q_8$.

Figure 4:
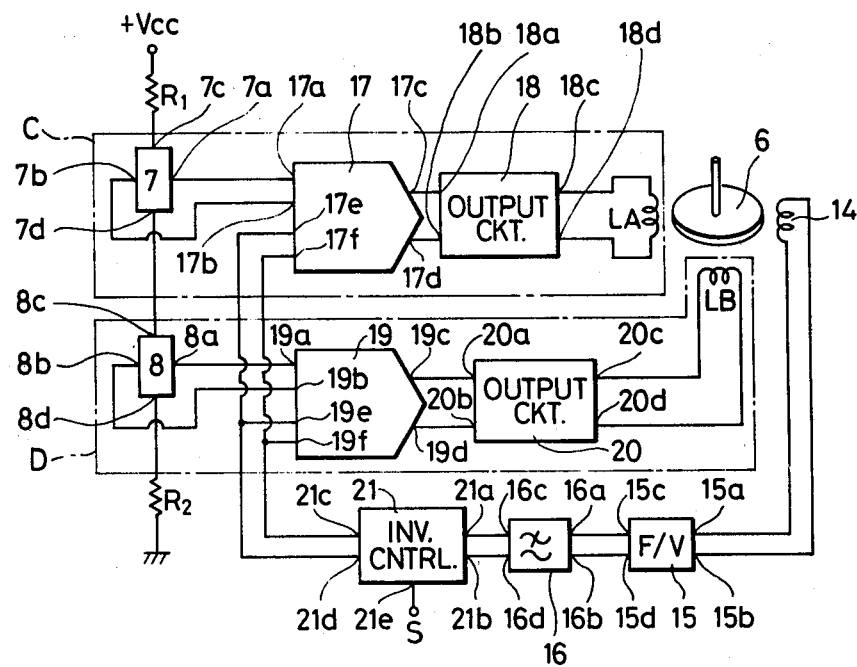
FIG. 4 is a block diagram showing a preferred embodiment of a drive circuit for a commutatorless DC motor according to the invention.

The base of the transistor $Q_5$, namely, the one differential control terminal 17e, and the base of the transistor $Q_6$, namely, the other differential control terminal 17f, are connected to the output terminals 21c and 21d of the inversion control circuit 21 (FIG. 4). The connections between the inversion control circuit 21 and the generating coil 14 are shown in FIG. 4. The commonly-connected emitters of the transistors $Q_5$ and $Q_6$ are connected to the collector of transistor $Q_9$, the emitter of which is grounded through a resistor $R_7$. The transistors $Q_8$ and $Q_9$ form a current mirror circuit.

In the output circuit 18, transistors $Q_{10}$ through $Q_{13}$ form a bridge circuit. A stator coil $L_A$ composed of coils 2 and 3 is connected between the commonly-connected collectors of the transistors $Q_{10}$ and $Q_{12}$, namely, a connecting point E, and the commonly-connected collectors of the transistors $Q_{11}$ and $Q_{13}$, namely, a connecting point F. The emitters of the transistors $Q_{10}$ and $Q_{11}$ are connected to the power source $+V_{cc}$, and the emitters of the transistors $Q_{12}$ and $Q_{13}$ are grounded. Transistors $Q_{14}$ and $Q_{15}$ form a push-pull circuit. The commonly-connected emitters of the transistors $Q_{14}$ and $Q_{15}$ are connected through a resistor $R_8$ to the connecting point E. The collector of the transistor $Q_{14}$ is connected to the base of the transistor $Q_{10}$ while the collector of the transistor $Q_{15}$ is connected to the base of the transistor $Q_{12}$. Transistors $Q_{16}$ and $Q_{17}$ also form a push-pull circuit, the commonly-connected emitters of which are connected through a resistor $R_9$ to the connecting point F. The collector of the transistor $Q_{16}$ is connected to the base of the transistor $Q_{11}$ while the collector of the transistor $Q_{17}$ is connected to the base of the transistor $Q_{13}$. A resistor $R_{10}$ is connected between the commonly-connected emitters of the transistors $Q_{14}$ and $Q_{15}$ and the commonly-connected emitters of the transistors $Q_{16}$ and $Q_{17}$. A series circuit of the resistors $R_{11}$, $R_{12}$ and $R_{13}$ is connected between the connecting points E and F.

In the output circuit 18, two operational amplifiers 23 and 24 are provided. One input terminal 23a of the operational amplifier 23 is connected to one differential output terminal 17c of the double-balance differential amplifier 17 and the other input terminal 23b is connected to a connecting point G between the resistors $R_{12}$ and $R_{13}$. The output terminal 23c of the operational amplifier 23 is connected to the commonly-connected bases of the transistors $Q_{16}$ and $Q_{17}$. One input terminal 24a of the other operational amplifier 24 is connected to the other differential output terminal 17d of the double-balance differential amplifier 17 and the other input terminal 24b is connected to a connecting point H between the resistors $R_{11}$ and $R_{12}$. The output terminal 24c of the operational amplifier 23 is connected to the common base of the transistors $Q_{14}$ and $Q_{15}$.

The circuitry shown in FIG. 6 operates as follows: As the constant voltage diode $D_z$ is connected to the base of the transistor $Q_7$, a constant current $I_1$ flows between the collector and the emitter of the transistor $Q_7$. As the transistor $Q_8$ provided at the emitter side of the transistor $Q_7$ and the transistor $Q_9$ in the double-balance differential amplifier 17 form a current mirror circuit as described above, a constant current $I_2$ corresponding to the current $I_1$ flows in the transistor $Q_9$. Currents $I_3$ and $I_4$ flows in the transistors $Q_5$ and $Q_6$ as components of the current $I_2$ generated according to the input voltages applied to the differential control terminals 17e and 17f, respectively. Currents $I_5$ and $I_6$ flow in the transistors $Q_1$ and $Q_2$ as components of the current $I_3$ determined according to the input voltages applied to the differential input terminals 17b and 17a, respectively. Similarly, currents $I_7$ and $I_8$ flow in the transistors $Q_3$ and $Q_4$ as components of the current $I_4$ determined according to the voltages applied to the differential input terminals 17a and 17b, respectively.

If the resistance values of the resistors $R_3$ and $R_4$ are equal and represented by $R_c$, and the collector voltages of the transistors $Q_1$ and $Q_4$ are represented by $V_A$ and $V_B$, respectively, then $$V_A = V_{cc} - R_c(I_5 + I_7) \text{ and} \tag{1}$$

$$V_B = V_{cc} - R_c(I_6 + I_8). \tag{2}$$

The output voltage $V_{OUT}$ developed across the differential output terminals 17c and 17d is:

$$\begin{aligned} V_{OUT} &= V_A - V_B \\ &= R_c(I_6 + I_8 - I_5 - I_7) \\ &= R_c(I_6 - I_5) + R_c(I_8 - I_7). \end{aligned} \tag{3}$$

The expression (3) indicates that the differential output voltage of the differential amplifier composed of the transistors $Q_1$ and $Q_2$ is added to the differential output voltage of the differential amplifier composed of the transistors $Q_3$ and $Q_4$. Since the two differential amplifiers receive the output voltage from the same Hall element, a sinusoidal output voltage is provided as the output voltage $V_{OUT}$ from the double-balance differential amplifier 17 according to the output voltage $V_H$ of the Hall element.

The relationships between the input voltages $V_G$ at the differential control terminals of the double-balance differential amplifier, the input voltages $V_H$ at the differential input terminals and the output voltages $V_{OUT}$ at the differential output terminals are as indicated by the graphical representation of FIG. 5.

Depending on the polarity (positive or negative) of the differential output voltage $V_{OUT}$, the transistors $Q_{14}$ and $Q_{17}$ and the transistors $Q_{15}$ and $Q_{16}$ are repeatedly and alternately rendered conductive and nonconductive by the output voltage difference between the operational amplifiers 23 and 24. Therefore, current flows through the transistors $Q_{10}$, $Q_{14}$, $Q_{17}$ and $Q_{13}$, and the transistors $Q_{10}$ and $Q_{13}$ are rendered conductive so that a current $I_L$ flows from the connecting point E to the connecting point F. That is, the current $I_L$ flows in the stator coil $L_A$. When the polarity of the differential output voltage $V_{OUT}$ is inverted, current flows through the transistors $Q_{11}$, $Q_{16}$, $Q_{15}$ and $Q_{12}$. The transistors $Q_{11}$ and $Q_{12}$ are rendered conductive, and therefore the current $I_L$ flows from the connecting point F to the connecting point E.

On the other hand, the input terminals 23a and 23b of the operational amplifier 23 and the input terminals 24a and 24b of the operational amplifier 24 are placed in a imaginary short-circuited state. Therefore, the differential output voltage $V_{OUT}$ is directly developed across the connecting points G and H. Thus, a current $I_9$ flowing in the resistor $R_{12}$ can be represented by $V_{OUT}/R_{12}$. The waveform of this current is sinusoidal. Accordingly, a voltage $V_L$ across the stator coil $L_A$ is:

$$V_L = I_9(R_{11} + R_{12} + R_{13})$$
$$= V_{OUT}(R_{11} + R_{12} + R_{13})/R_{12}.$$

Thus, the voltage $V_L$ is sinusoidal with an amplitude in proportion to the output voltage of the Hall element. Accordingly, the current $I_L$ flowing in the stator coil $L_A$ is also sinusoidal.

The same circuitry as described above is provided for the other phase B and operates similarly.

In the above-described embodiment, the amplification factors of the double-balance differential amplifiers are varied by controlling the input voltages to the differential control terminals of the double-balance differential amplifiers in order to control the rotational speed. Accordingly, sufficiently large input currents can be supplied to the Hall elements to obtain sufficiently high output voltages. Therefore, the offset voltages of the double-balance differential amplifiers are insignificant and can be disregarded and currents are supplied to the stator coils according to the output voltages of the Hall elements which are proportional to the pole variations of the rotor magnet. Thus, the commutatorless DC motor is rotated stably and smoothly.

Figure 7:
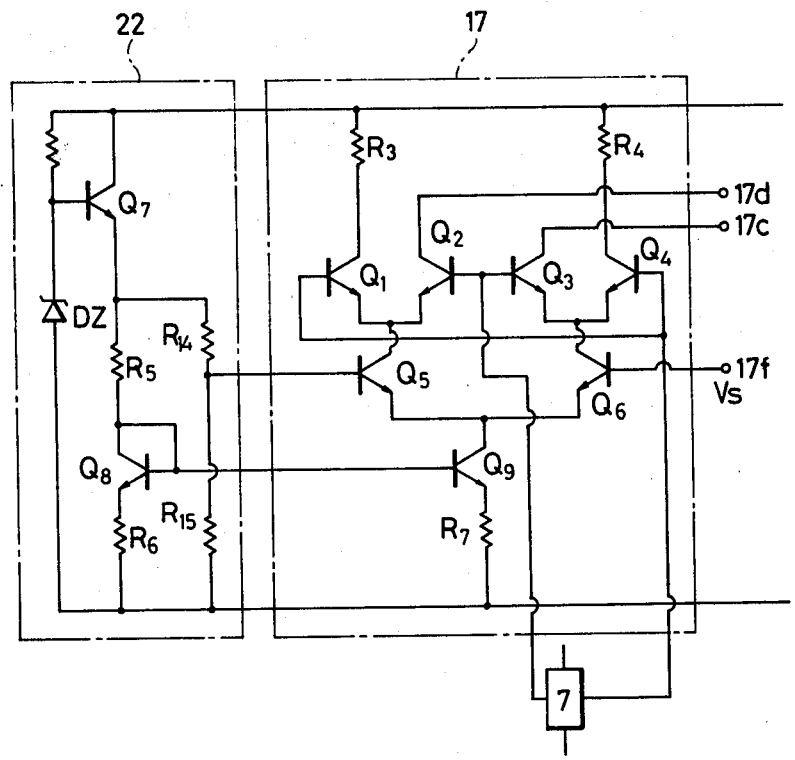
FIG. 7 is a circuit diagram showing another specific example of a drive circuit according to the invention.

In the above-described embodiment, the output terminals 21c and 21d of the inversion control circuit 21 are connected to the differential control terminals 17e and 17f of the double-balance differential amplifier 17. However, as shown in FIG. 7, the differential control terminal 17e, i.e. the base of the transistor $Q_5$, may be connected to the connecting point between resistors $R_{14}$ and $R_{15}$. In this case, the resistor $R_{14}$ is connected to the emitter of the transistor $Q_7$ and the resistor $R_{15}$ is grounded. Therefore, a constant voltage is applied to the base of the transistor $Q_5$, namely, the differential control terminal 17e. The difference voltage between the output terminals 21c and 21d should be applied to the other differential control terminal 17f. The direction of rotation of the motor is determined in accordance with whether a value $V_s - E_s$ (where $V_s$ is the aforementioned difference voltage and $E_s$ is the constant voltage applied to the one differential control terminal 17e) is positive or negative, with the absolute value $|V_s - E_s|$ thereof determining the rotational speed.

Figure 8:
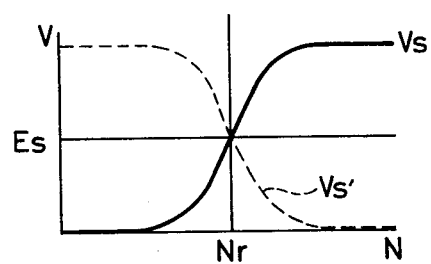
FIG. 8 is a graphical representation indicating relationships between the number of revolutions per minute and the output of an inversion control circuit.

The rotational speed control will further be described. The relationships between the number N of revolutions per minute of the rotor 6 and the voltage $V_s$ which is generated by the generating coil 14 of the frequency generator and is applied to the other differential terminal 17f through the frequency-to-voltage converter 15, the low-pass filter 16 and the inversion control circuit 21, are as indicated by the solid line in FIG. 8. In this connection, the constant voltage $E_s$ applied to the differential control terminal 17e is set to correspond to a predetermined number of revolutions per minute $N_r$. If the rotational speed becomes smaller than $N_r$, the input voltage $V_s$ to the other differential control terminal 17f becomes lower than the constant voltage $E_s$, as a result of which the differential output voltage is increased to increase the amount of current flowing in the stator coil to thereby accelerate the motor. If the speed of the motor is increased to higher than $N_r$ by this action, then the input voltage becomes higher than the constant voltage $E_s$, and therefore the polarity of the differential output voltage of the double-balance differential amplifier is inverted while the phase of the current flowing in the stator coil is also inverted, to thereby slow the rotor by exerting a braking action. When the speed becomes lower than $N_r$ by the braking action, the input voltage $N_r$ becomes lower than the constant voltage $E_s$, and therefore the acceleration is effected again.

That is, when the revolutions per minute of the motor is lower than the predetermined number $N_r$ of revolutions per minute corresponding to the constant voltage $E_s$ applied to the one differential control terminal 17e, the motor is accelerated, and when the former is higher than the latter, the motor is braked. Thus, the motor is rotated at a constant speed at all times.

When the direction of rotation is different, the inversion signal S is applied to the control terminal 21e of the inversion control circuit 21. In this case, an input voltage $V_s'$ applied to the other differential control terminal 17f is as indicated by the dotted line ($V_s'$) in FIG. 8, and therefore the speed of the motor is maintained constant.

Next, a method of quickly stopping the motor will be described with reference to FIGS. 7 and 9.

Figure 9A:
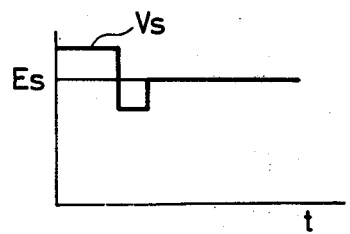
FIG. 9(a) is a timing chart indicating variations of an input voltage applied to the differential control terminal of the double-balance differential amplifier when it is required to quickly stop the motor.
Figure 9B:
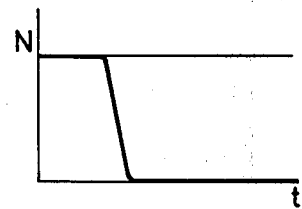
FIG. 9(b) is a timing chart indicating variations of the speed of the motor until the latter is stopped.

When it is required to quickly stop the motor, the input voltage $V_s$ applied to the other differential control terminal 17f of the double-balance differntial amplifier 17 is temporarily made lower than the the constant voltage $E_s$ at the differential control terminal 17f and then $V_s$ is made equal to $E_s$, as shown in FIG. 9(a). As a result, the motor is stopped in a short time as shown in FIG. 9(b).

Figure 10A:
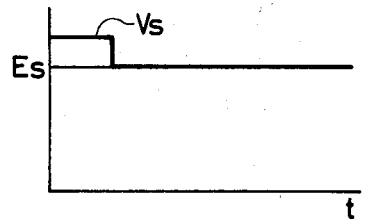
FIG. 10(a) is a timing chart indicating the variations of an input voltage applied to the differential control terminal when it is required to gradually stop the motor.
Figure 10B:
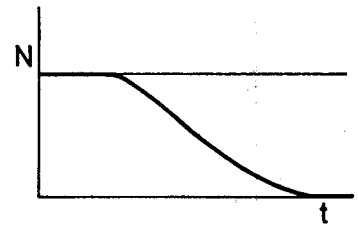
FIG. 10(b) is a timing chart indicating the variations of the speed of the motor until the latter is stopped.

When it is required to slowly or gradually stop the motor, the input voltage $V_s$ is set equal to the constant voltage $E_s$ as indicated in FIG. 10 (a). As a result, the motor is gradually stopped as shown in FIG. 10(b).

If it is required to prevent overshooting of rotational speed at the start and to stabilize the speed of the motor at a predetermined value in a short time, the input voltage is inverted so that the direction of rotation is temporarily reversed. That is, the above-described method of quickly stop-pint the motor can be employed.

In the above-described embodiment, the direction of rotation and the rotational speed are controlled by the input voltages applied to the differential control terminals of the double-balance differential amplifiers. However, if the input voltages are used to control the direction of rotation only and the rotational speed is controlled by varying the amplification factors of the output circuits, the value of the resistor $R_{12}$ in FIG. 6 may be varied, or an amplifier the amplification factor of which is controlled according to the rotational speed of the motor may be connected between the double-balance differential amplifier and the output circuit.

Figure 6:
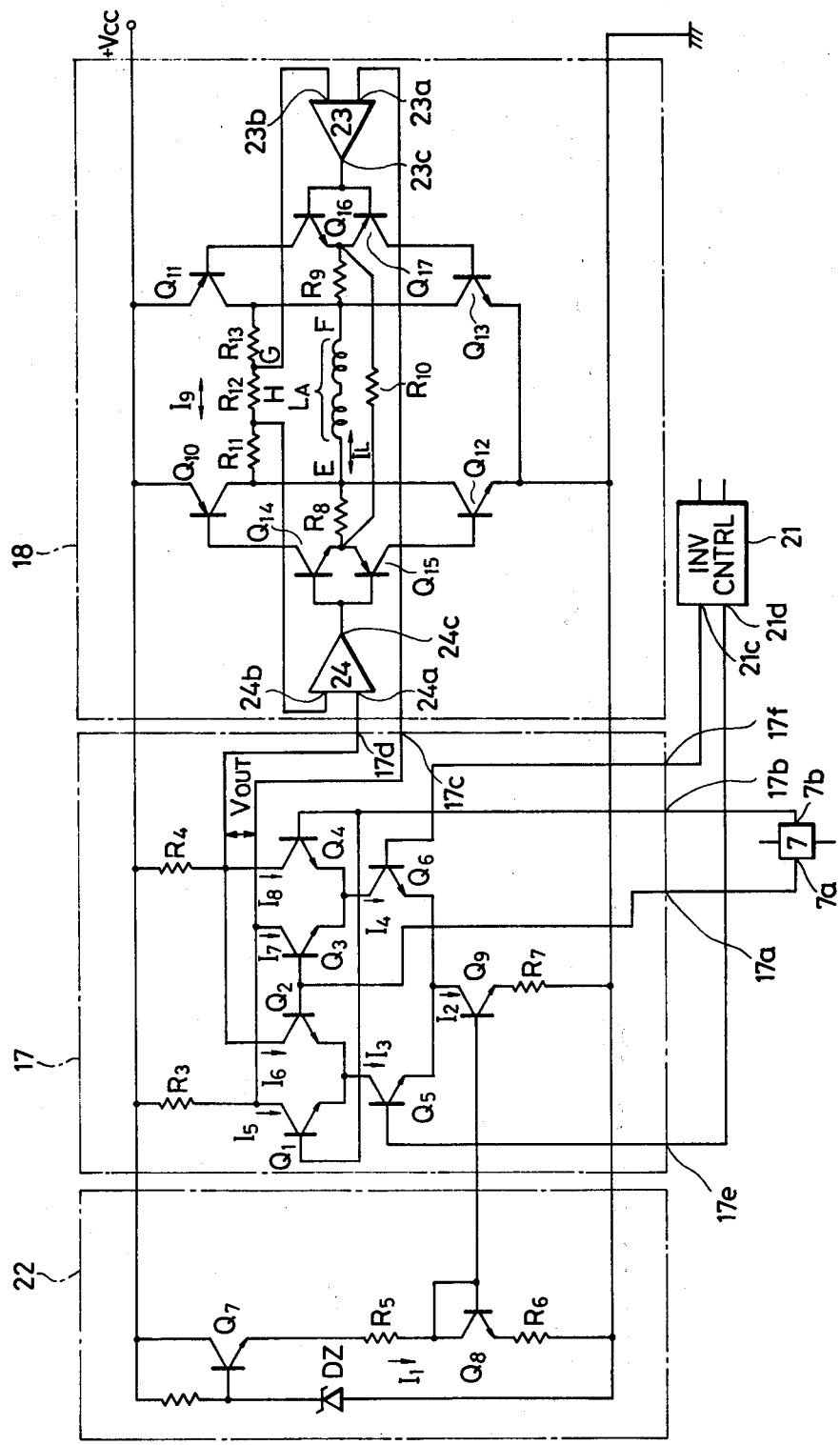
FIG. 6 is a detailed circuit diagram showing a specific example of a drive circuit according to the invention.

While, in the device shown in FIG. 6, the voltage signals applied to the stator coils made to have the same waveform as the outputs of the Hall elements, alternatively, currents flowing through the stator coils may be controlled in accordance with the outputs of the Hall elements. In such an alternate construction, the outputs of the Hall elements are amplified by amplifiers whose outputs are applied to the resistor $R_{12}$. Accordingly, a voltage corresponding to the outputs of the Hall elements appears across the resistor $R_{12}$. The current flowing through the resistor $R_{12}$ is then amplified and applied to the stator coils.

The following advantages are obtained with either of the embodiments:

(1) The gain of the output circuit can be determined by merely adjusting the resistance value of one resistor. Further, this adjustment has no undesired effect upon the other circuit elements. Therefore, the adjustment of the gain can be readily accomplished and the reliability of the circuit is improved.

(2) The adjustment of the gain can be accomplished by adjusting the resistance ratio of resistors. Thus, temperature-affected drift can be eliminated by proper choice of the temperature coefficient. This results in prevention of variations in gain.

(3) Resistors in IC circuits typically have tolerances of +30% in resistance values. However, in the device of the invention, since the gain is determined by a ratio of resistors, the differences can be cancelled out. Thus, the adjustment can be achieved with a high accuracy.

As described above, in accordance with the invention, double-balance differential amplifiers are employed to amplify the output signals from magnetic sensitive elements such as Hall elements, and the rotational speed of the motor is controlled by the input signals applied to the differential control terminals of the double-balance differential amplifiers. Therefore, sufficiently large input currents are applied to the magnetic sensitive elements to obtain sufficiently high output voltages.

Accordingly, the output voltages of the magnetic sensitive elements, which are much higher than the offset voltages of the double-balance differential amplifiers, are applied thereto. Thus, the offset voltages of the amplifiers are insignificant and can be disregarded in operation.

For the same reason, error components due to the offset voltages are not included in the currents flowing in the stator coils. Therefore, the commutatorless DC motor of the invention is stably rotated at all times.

If the differential input voltage of each double-balance differential amplifier is high, the differential output voltage approaches a saturation value asymptotically. Therefore, fluctuations in the output voltages of the magnetic sensitive elements can be rendered insignificant by increasing the output voltages of the magnetic sensitive elements. Moreover, it is unnecessary to adjust the output voltages of the magnetic sensitive elements.

Furthermore, the invention is advantageous in that the direction of rotation of the motor and the starting and stopping the motor can be readily controlled.

While the invention has been described with reference to a two-phase ten-pole commutatorless DC motor, it is evident that the invention is not limited thereto or thereby. That is, in the application of the technical concept of the invention, the number of phases and the number of poles can be freely selected.

What is claimed is:

1. A commutatorless DC motor drive device comprising:
   a rotor magnet magnetized to have a plurality of magnetic poles;
   a plurality of stator coils arranged in correspondence with said rotor magnet;
   magnetic sensitive elements for detecting positions of said magnetic poles of said rotor magnet and for producing output signals having output signal waveforms;
   means for amplifying the output signal of each magnetic sensitive element;
   means for producing signals each having a current waveform substantially the same as the output signal waveform of a respective one of said magnetic sensitive elements, said signal producing means having a resistor to which an output of said means for amplifying is applied; and
   means for delivering current signals to said stator coils said current signals having the same waveform as the current flowing through said resistor.

2. The commutatorless DC motor drive device of claim 1 wherein said means for amplifying outputs of said magnetic sensitive elements comprises double-balance differential amplifiers circuits equal in number to the number of said magnetic sensitive elements.

3. The commutatorless DC motor drive device of claim 1 further comprising means for providing a control signal corresponding to a rotational speed of said rotor magnet; and means for controlling a gain factor of said amplifying means in accordance with said control signal.

4. The commutatorless DC motor drive device of any of claims 1–3 wherein said means for controlling comprises first through fourth transistors connected in a bridge circuit, a stator coil being connected between opposed connection points of said bridge circuit; and wherein said means for producing signals comprises first through third resistors connected in series with each other and in parallel with said stator coil, said signal having said substantially same current waveform being produced across a center one of said first through third resistors.

5. A commutatorless DC motor drive device of the type comprising a rotor magnet magnetized to have a plurality of magnetic poles, a plurality of stator coils arranged in correspondence with said rotor magnet, magnetic sensitive elements for detecting positions of said magnetic poles and for producing output signals, amplification means for amplifying said output signals, means for controlling currents supplied to said stator coils in accordance with said amplified output signals and speed signal means for producing a signal corresponding to the rotational speed of said rotor magnet, the improvement characterized in that said amplification means comprises variable amplification means for amplifying said output signals with a gain in accordance with a gain control signal, and control means responsive to said signal corresponding to the rotational speed of said motor for providing said gain control signal to said variable amplification means.

6. The commutatorless DC motor drive device of claim 5 wherein said speed signal means comprises a generating coil disposed adjacent said rotor for producing a signal having a frequency determined by a speed of rotation of said rotor and a frequency-to-voltage converter receiving an output from said generating coil for producing a voltage representative of said speed of rotation of said rotor; and wherein said control means comprises inversion control circuit means receiving said voltage representative of said speed of rotation of said rotor and an inversion control signal for producing said gain control signals.

7. A commutatorless DC motor drive device as claimed in claim 5, wherein said variable amplification means comprises double-balance differential amplifier circuits having differential input voltage terminals for receiving outputs of corresponding magnetic sensitive elements and having differential control voltage terminals for receiving said gain control signals.

8. The commutatorless DC motor drive device of claim 7 wherein each said output circuit comprises first through fourth transistors connected in a bridge circuit, a stator coil being connected between first and second connection points on opposite sides of said bridge circuit; fifth and sixth transistors having emitters coupled together and through a first resistor to said first connection point, a collector of fifth transistor being coupled to a base of said first transistor, and a collector of said sixth transistor being coupled to a base of said second transistor; seventh and eighth transistors having emitters coupled together and through a second resistor to said second connection point, said seventh transistor having a collector coupled to a base of said third transistor, and said eighth transistor having a collector coupled to a base of said fourth transistor; a first operational amplifier having an output coupled to bases of said fifth and sixth transistors; a second operational amplifier having an output coupled to bases of said seventh and eighth transistors; and third through fourth resistors coupled in series with one another and then between said first and second connection points, a connection point between said third and fourth resistors being coupled to a first input of said first operational amplifier and a connection point between said fourth and fifth resistors being coupled to a first input of said second operational amplifier, and second inputs of said first and second operational amplifiers being coupled in differential outputs of a corresponding double-balance differential amplifier.

9. The commutatorless DC motor drive device of claim 8 wherein each said double-balance differential amplifier circuit comprises first through third differential transistor pairs, commonly-coupled emitters of said first differential transistor pair being coupled to a collector of a first transistor of said third differential transistor pair and commonly-connected emitters of said second differential transistor pair being coupled to a collector of a second transistor of said third differential transistor pair; and a constant current source for supplying a constant current to commonly-connected emitters of said first and second transistors of said third differential transistor pair, output signals from said inversion control circuit means being coupled to bases of said first and second transistors of said third differential transistor pair, a second input of said first operational amplifier being coupled to collectors of first transistors of said first and second differential transistor pairs and a second input of said second operational amplifier being coupled to collectors of second transistors of said first and second differential transistor pairs, and outputs of a corresponding magnetic sensitive element being coupled to bases of said transistors of said first and second differential transistor pairs.

10. The commutatorless DC motor drive device of claim 8 wherein each said double-balance differential amplifier circuit comprises first through third differential transistor pairs, commonly-coupled emitters of said first differential transistor pair being coupled to a collector of a first transistor of said third differential transistor pair and commonly-connected emitters of said second differential transistor pair being coupled to a collector of a second transistor of said third differential transistor pair; and a contant current source for supplying a constant current to commonly-connected emitters of said first and second transistors of said third differential transistor pair, an output signal from said inversion control circuit means being coupled to a base of one of said first and second transistors of said third differential transistor pair and a constant voltage being applied to the base of the other of said first and second transistors of said third differential transistor pair, a second input of said first operational amplifier being coupled to collectors of first transistors of said first and second differential transistor pairs and a second input of said second operational amplifier being coupled to collectors of second transistors of said first and second differential transistor pairs, and outputs of a corresponding magnetic sensitive element being coupled to bases of said transistors of said first and second differential transistor pairs.

* * * * *